US009824345B2

(12) United States Patent
Chihara (10) Patent No.: US 9,824,345 B2
(45) Date of Patent: Nov. 21, 2017

(54) RECEIPT GENERATING DEVICE, AND CONTROL METHOD OF A RECEIPT GENERATING DEVICE

(71) Applicant: Seiko Epson Corporation, Tokyo (JP)

(72) Inventor: Kazunori Chihara, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 14/428,283

(22) PCT Filed: Oct. 4, 2013

(86) PCT No.: PCT/JP2013/005945
§ 371 (c)(1),
(2) Date: Mar. 13, 2015

(87) PCT Pub. No.: WO2014/057645
PCT Pub. Date: Apr. 17, 2014

(65) Prior Publication Data
US 2015/0262157 A1   Sep. 17, 2015

(30) Foreign Application Priority Data

Oct. 10, 2012   (JP) ................................ 2012-224848

(51) Int. Cl.
G06G 1/12 (2006.01)
G06Q 20/00 (2012.01)
(Continued)

(52) U.S. Cl.
CPC ....... *G06Q 20/202* (2013.01); *G06Q 20/0453* (2013.01); *G06Q 20/209* (2013.01);
(Continued)

(58) Field of Classification Search
CPC ...... G06Q 20/20–20/209; G06Q 30/02; G06Q 30/0217–30/64; G06Q 30/06; G06Q 20/20
(Continued)

(56) References Cited

U.S. PATENT DOCUMENTS 5,789,732 A * 8/1998 McMahon ....... G06K 19/07703
235/380
6,067,529 A * 5/2000 Ray ..................... G06Q 20/0453
380/270
(Continued)

FOREIGN PATENT DOCUMENTS

| CN | 101221511 A | 7/2008 |
|---|---|---|
| CN | 102609838 A | 7/2012 |

(Continued)

*Primary Examiner* — Olusegun Goyea
(74) *Attorney, Agent, or Firm* — Nutter McClennen & Fish LLP; John J. Penny, Jr.; Joshua I. Rudawitz (57) ABSTRACT

To appropriately execute a receipt generating process based on whether or not an application is installed on a mobile terminal as the target communication device. A printer driver according to the invention has an installation decision unit that determines if a specific application is installed on a mobile device targeted for communication; a receipt generation decision unit that determines whether or not to generate a paper receipt and/or electronic receipt based on the decision of the installation decision unit; and receipt generating process units that execute paper receipt and/or electronic receipt generating processes according to the decision of the receipt generation decision unit.

11 Claims, 7 Drawing Sheets

(51) Int. Cl.
*G06Q 20/20* (2012.01)
*G07G 1/00* (2006.01)
*G06Q 20/04* (2012.01)
*G07G 5/00* (2006.01)
*G06Q 20/32* (2012.01)

(52) U.S. Cl.
CPC ....... *G06Q 20/322* (2013.01); *G06Q 20/3278* (2013.01); *G07G 1/00* (2013.01); *G07G 5/00* (2013.01)

(58) Field of Classification Search
USPC ... 705/7.29, 14.23–14.27, 26.41, 16, 21, 24, 705/30, 39; 235/375–385, 436
See application file for complete search history.

(56) References Cited

U.S. PATENT DOCUMENTS

| | | | | |
|---|---|---|---|---|
| 6,341,353 | B1* | 1/2002 | Herman | A63F 13/12 705/39 |
| 6,533,168 | B1* | 3/2003 | Ching | G06K 7/10722 235/375 |
| 6,543,683 | B2* | 4/2003 | Hoffman | G06Q 20/0453 235/375 |
| 6,736,322 | B2* | 5/2004 | Gobburu | G06Q 20/04 235/462.01 |
| 6,920,431 | B2* | 7/2005 | Showghi | G06Q 10/02 705/15 |
| 7,328,002 | B2* | 2/2008 | Goto | G06Q 20/04 379/265.02 |
| 7,431,202 | B1* | 10/2008 | Meador | G06Q 20/32 235/379 |
| 2002/0023215 | A1* | 2/2002 | Wang | G06Q 20/00 713/171 |
| 2002/0060246 | A1* | 5/2002 | Gobburu | G06Q 20/04 235/462.46 |
| 2002/0147645 | A1* | 10/2002 | Alao | G06Q 30/0209 705/14.54 |
| 2003/0033272 | A1* | 2/2003 | Himmel | G06Q 10/02 |
| 2003/0055733 | A1* | 3/2003 | Marshall | G06Q 20/0453 705/24 |
| 2003/0158819 | A1* | 8/2003 | Scott | G06F 21/10 705/65 |
| 2005/0021478 | A1* | 1/2005 | Gautier | G06Q 20/12 705/65 |
| 2006/0095339 | A1* | 5/2006 | Hayashi | G06Q 30/06 705/26.8 |
| 2006/0100924 | A1* | 5/2006 | Tevanian, Jr. | G06Q 30/02 705/14.23 |
| 2007/0069013 | A1* | 3/2007 | Seifert | G06Q 20/0453 235/383 |
| 2007/0287413 | A1* | 12/2007 | Kleitsch | H04L 12/14 455/405 |
| 2008/0065487 | A1* | 3/2008 | Shea | G06Q 30/02 705/14.61 |
| 2008/0313066 | A1* | 12/2008 | Sholtis | G06Q 30/06 705/35 |
| 2009/0006151 | A1* | 1/2009 | Zarghami | G06Q 10/06375 705/7.31 |
| 2009/0157512 | A1* | 6/2009 | King | G06Q 10/10 705/14.27 |
| 2010/0177343 | A1* | 7/2010 | Shapiro | G06Q 10/0637 358/1.15 |
| 2011/0099073 | A1* | 4/2011 | Yigit | G06F 17/30528 705/14.66 |
| 2011/0208561 | A1* | 8/2011 | Randall | G06Q 30/02 705/7.32 |
| 2012/0084391 | A1* | 4/2012 | Patel | G06Q 20/0453 709/217 |
| 2012/0166298 | A1* | 6/2012 | Smith | G06Q 20/209 705/24 |
| 2012/0191522 | A1* | 7/2012 | McLaughlin | G06Q 50/01 705/14.23 |
| 2012/0209630 | A1* | 8/2012 | Ihm | G06Q 20/3274 705/4 |
| 2012/0271725 | A1* | 10/2012 | Cheng | H04W 4/008 705/21 |
| 2012/0280040 | A1* | 11/2012 | Carney | G06Q 20/0453 235/383 |
| 2012/0284081 | A1* | 11/2012 | Cheng | G06Q 30/02 705/7.29 |
| 2012/0284130 | A1* | 11/2012 | Lewis | G06Q 40/00 705/16 |
| 2012/0290609 | A1* | 11/2012 | Britt | G06Q 30/06 707/769 |
| 2012/0316950 | A1* | 12/2012 | LaPorte | G06Q 20/3276 705/14.33 |
| 2012/0316959 | A1* | 12/2012 | Hymel | G06Q 50/01 705/14.53 |
| 2012/0324242 | A1* | 12/2012 | Kirsch | G06Q 20/0855 713/189 |
| 2013/0073365 | A1* | 3/2013 | McCarthy | G06Q 20/02 705/14.23 |
| 2013/0110728 | A1* | 5/2013 | Kobres | G06Q 30/06 705/75 |
| 2013/0124346 | A1* | 5/2013 | Baldwin | G06Q 20/322 705/16 |
| 2013/0144731 | A1* | 6/2013 | Baldwin | G06Q 20/20 705/17 |
| 2013/0151344 | A1* | 6/2013 | Tavares | G06Q 30/0201 705/14.65 |
| 2013/0159080 | A1* | 6/2013 | Wu | G06Q 30/02 705/14.23 |
| 2013/0238455 | A1* | 9/2013 | Laracey | G06Q 20/108 705/21 |
| 2013/0246147 | A1* | 9/2013 | Chen | G06Q 30/0226 705/14.25 |
| 2013/0256403 | A1* | 10/2013 | MacKinnon Keith | G06K 5/00 235/375 |
| 2013/0262179 | A1* | 10/2013 | Harada | G06Q 30/0201 705/7.29 |
| 2013/0305035 | A1* | 11/2013 | Lyne | H04W 4/008 713/150 |
| 2013/0337913 | A1* | 12/2013 | Tardif | G07F 17/3211 463/31 |
| 2013/0346176 | A1* | 12/2013 | Alolabi | G06Q 30/0222 705/14.23 |

FOREIGN PATENT DOCUMENTS

| | | | |
|---|---|---|---|
| JP | 2004-151838 A | | 5/2004 |
| JP | 2005-056143 A | | 3/2005 |
| JP | 2005056143 A | * | 3/2005 |
| JP | 2005-141649 A | | 6/2005 |
| JP | 2005-149063 A | | 6/2005 |
| JP | 2009-015768 A | | 1/2009 |
| JP | 2009-042931 A | | 2/2009 |
| JP | 2010-092087 A | | 4/2010 |
| JP | 2010-097319 A | | 4/2010 |

* cited by examiner

RECEIPT GENERATING DEVICE, AND CONTROL METHOD OF A RECEIPT GENERATING DEVICE

Priority is claimed under 35 U.S.C. §119 to Japanese Application No. 2012-224848 filed on Oct. 10, 2012 and under 35 U.S.C. §365 to PCT/JP2013/005945 filed on Oct. 4, 2013.

TECHNICAL FIELD

The present invention relates to a receipt generating device that executes a receipt generating process for producing paper receipts and/or electronic receipts, and to a control method of the receipt generating device.

BACKGROUND

Electronic receipt generating systems that can produce electronic receipts digitizing receipt information are known from the literature. For example, PTL1 describes executing an electronic receipt generating process by writing an electronic receipt by near-field communication to an IC card that is used as a member card.

PATENT LITERATURE

[PTL 1] JP-A-2005-141649

SUMMARY OF INVENTION

As use of cell phones and smartphones has exploded, technologies for issuing receipts to cell phones and smartphones have developed. All cell phones and smartphones do not, however, have the ability to receive electronic receipts. Smartphones, for example, enable users to install their applications of choice. Even if the user has a smartphone, however, a specific application enabling receiving electronic receipts may not be installed. More specifically, while the smartphone itself may be able to receive electronic receipts, whether or not a receipt can be received depends on whether a specific application is installed. However, unnecessary processes such as sending an electronic receipt to a smartphone without an electronic receipt receiving function may be executed because conventional receipt generating devices do not detect if a particular application is installed in the target smartphone. Because communication via near-field communication, for example, is possible, communication could be determined to have been successful even though electronic receipts cannot be saved in the smartphone. A receipt is therefore not issued in this event because a paper receipt is not issued in addition to an electronic receipt not being issued.

With consideration for the foregoing problems, an object of the present invention is to provide a receipt generating device that can appropriately execute a receipt generating process based on whether or not an application is installed in the target mobile device, and to provide a control method of the receipt generating device.

Solution to Problem

A receipt generating device according to the invention includes: a decision unit that determines if an application that processes electronic receipts is installed on a mobile terminal; and a receipt generating process unit that determines whether or not to generate the electronic receipt according to the decision of the decision unit, and executes an electronic receipt generating process according to the decision.

A control method of a receipt generating device according to the invention includes: communicating with a mobile terminal; determining if an application that processes electronic receipts is installed on the mobile terminal; determining whether or not to generate the electronic receipt according to the decision; and executing an electronic receipt generating process that produces the electronic receipt according to the decision.

These configurations of the invention determine whether or not to produce an electronic receipt according to the result of determining if an application is installed on a mobile terminal targeted for communication. Unnecessary processing can therefore be prevented because the electronic receipt generating process is not executed when an application rendering an electronic receipt receiving function is not installed, for example.

A configuration that determines whether or not to produce a paper receipt or an electronic receipt based on the result of determining if an application is installed on a mobile terminal is also conceivable. Because the function of the application is not limited in this configuration, configurations that do not execute the electronic receipt generating process or the paper receipt generating process when the application is installed are conceivable. Conversely, configurations that execute the electronic receipt generating process or the paper receipt generating process when the application is not installed are also conceivable.

A paper receipt means a receipt that is printed by a printer. An electronic receipt means a receipt containing digitized transaction information (including transaction amount, purchased products, price, for example). An electronic receipt also includes mobile receipts that are sent directly to the customer's home PC, mobile device, or IC card by e-mail or short-range wireless communication, for example, and web receipts that the customer can view by accessing a specific web address.

A receipt generating device may be a dedicated device or a configuration incorporated as part of a POS (Point Of Sales) terminal that processes sale transactions. A configuration embedded as part of a printer that prints paper receipts is also conceivable.

In the foregoing receipt generating device, the receipt generating process unit executes the electronic receipt generating process if the decision unit determines the application is installed on the mobile terminal; and the receipt generating process unit does not execute the electronic receipt generating process if the decision unit determines the application is not installed on the mobile terminal.

This aspect of the invention can prevent unnecessary electronic receipt generating processes when the application is an application that renders an electronic receipt receiving function.

In a receipt generating device according to another aspect of the invention, the decision unit determines if web registration processed by the application has been completed; the receipt generating process unit executes the electronic receipt generating process to send the electronic receipt to a server connected to a network if the decision unit determines web registration has been completed; and the receipt generating process unit executes the electronic receipt generating process to send the electronic receipt to the mobile terminal if the decision unit determines web registration has not been completed.

When web registration processed by the application has been completed, this aspect of the invention can provide a service that sends an electronic receipt to a server connected to a network (web receipt generating service). When web registration processed by the application has not been completed, this aspect of the invention can provide a service that sends an electronic receipt to a mobile terminal (mobile receipt generating service).

Whether web registration has been completed can be determined based on if certain information has been registered, such as a customer ID for viewing a web receipt or an e-mail address.

When information is registered in the mobile terminal, the receipt generating device may also acquire this information. Because this configuration enables identifying an individual based on the acquired specific information, the purchasing behavior of the customer can also be analyzed by storing the specific information linked to transaction information in a transaction process database.

In a receipt generating device according to another aspect of the invention, the receipt generating process unit executes the electronic receipt generating process to send the electronic receipt to the mobile terminal if the decision unit determines web registration has been completed.

When web registration processed by the application has been completed, this aspect of the invention can provide both a service that sends an electronic receipt to a server connected to a network (web receipt generating service), and a service that sends an electronic receipt to a mobile terminal (mobile receipt generating service).

In a receipt generating device according to another aspect of the invention, the receipt generating process unit executes a paper receipt generating process to produce a paper receipt if the decision unit determines the application is not installed on the mobile terminal.

A control method of a receipt generating device according to another aspect of the invention further includes executing the electronic receipt generating process if the application is installed on the mobile terminal; and not executing the electronic receipt generating process, and executing a paper receipt generating process that produces a paper receipt, if the application is not installed on the mobile terminal.

When the application is an application rendering an electronic receipt receiving function in this aspect of the invention, a service that sends the electronic receipt to the mobile terminal cannot be provided, but not producing a receipt can be prevented by issuing a paper receipt instead.

In a receipt generating device according to another aspect of the invention, the application can set a receipt generating condition including whether or not to generate the paper receipt and/or the electronic receipt; and the receipt generating process unit executes the paper receipt generating process and/or the electronic receipt generating process according to the receipt generating conditions if the decision unit determines the application is installed on the mobile terminal.

This aspect of the invention can issue the receipt desired by the user (paper receipt and/or electronic receipt) as a result of the user setting the receipt generating conditions.

DETAILED DESCRIPTION

Embodiment 1

A first embodiment of the invention is described below with reference to the accompanying figures. The receipt generating device according to this embodiment is described as applied to a printer driver 12.

Figure 1:
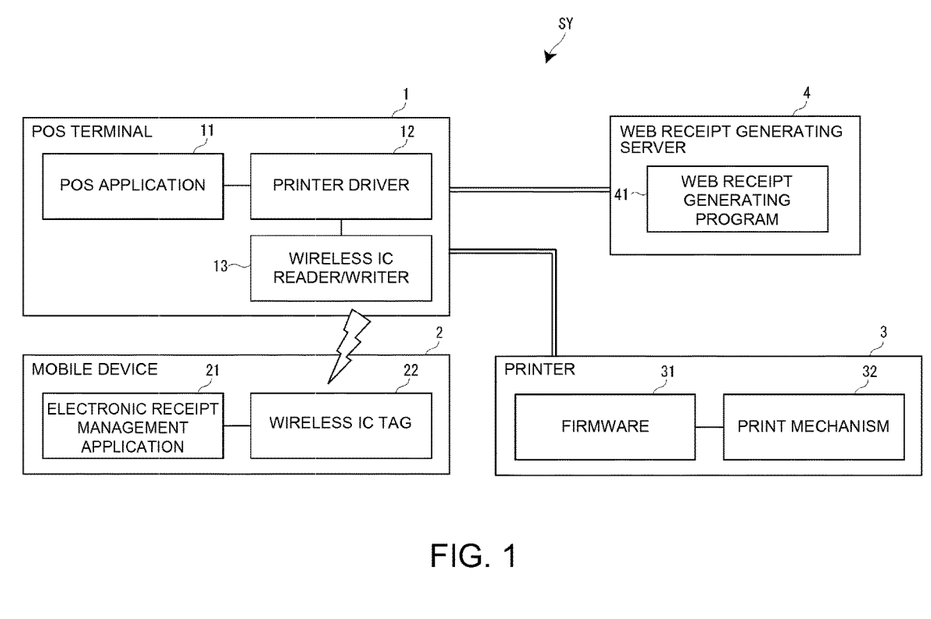
FIG. 1 is a system configuration diagram of a receipt generating system according to a first embodiment of the invention.

FIG. 1 is a system configuration diagram of a receipt generating system SY according to the first embodiment of the invention. The receipt generating system SY includes a POS (point of sales) terminal 1 and a printer 3 installed in a retail store, a mobile device 2 owned (carried) by a customer, and a web (World Wide Web) receipt generating server 4 connected to a computer network on the Internet. The POS terminal 1 and printer 3 are connected through a dedicated cable or a LAN (Local Area Network). The POS terminal 1 and web receipt generating server 4 are connected through a computer network. Note that the POS terminal 1 and the web receipt generating server 4 are connected 1:1 in the figure, but a many:1 connection is also conceivable.

The POS terminal 1 is embodied by a mobile terminal, personal computer ("PC" below), or tablet computer, for example, and has a POS application 11, printer driver 12, and wireless IC reader/writer 13.

The POS application 11 runs a transaction process (including inputting product information and prices, calculating the transaction amount, generating receipt data). The printer driver 12 controls a printer 3 that prints paper receipts. In this embodiment, the printer driver 12 also determines whether or not to generate a paper receipt and/or an electronic receipt, and runs the receipt generating process.

The wireless IC reader/writer 13 communicates with a wireless IC tag 22 in the mobile device 2. In this embodiment, the wireless IC reader/writer 13 is used mainly for sending electronic receipts (mobile receipts) and receiving the chip ID from the wireless IC tag 22. Note that the wireless IC reader/writer 13 in this embodiment uses NFC (Near-Field Communication (TM)). Alternatively, a short-range wireless communication standard (contactless communication standard) or an infrared communication standard may be used.

The mobile device 2 may be a notebook computer, a small tablet computer such as a smartphone, or a cell phone, for example, and has an electronic receipt management application 21 (application) and a wireless IC tag 22. The electronic receipt management application 21 is downloaded from an application server not shown, and used to manage electronic receipts. Note that included in electronic receipts are mobile receipts that can be received directly from a POS terminal 1 (wireless IC reader/writer 13) when a transaction is processed, and web receipts that can be viewed by the customer accessing a specific web address. The electronic receipt management application 21 processes web registration for acquiring receipt data, generating and storing mobile receipts, and producing web receipts.

The wireless IC tag 22 is, for example, an NFC tag (TM), and has a wireless IC chip and antenna (both not shown in the figures). The antenna sends and receives signals to and from the wireless IC reader/writer 13. The wireless IC chip controls sending and receiving, and stores a chip ID. The chip ID is a specific ID that uniquely identifies the wireless IC chip (=wireless IC tag 22).

The printer 3 is a receipt printer that produces paper receipts, and has firmware 31 and a print mechanism 32. The firmware 31 includes data and programs for operating the printer 3. The print mechanism 32 includes a printhead, paper conveyance mechanism, and paper cutter mechanism.

The web receipt generating server 4 has a web receipt generating program 41. The web receipt generating program 41 executes the web receipt generating process. More specifically, the web receipt generating program 41 generates data for web receipts and publishes web receipts.

The functional configuration of the receipt generating system SY is described next with reference to FIG. 2. The POS application 11 has a transaction processing unit 51 as its main functional component. The transaction processing unit 51 generates receipt data indicating the result of the transaction process. Note that print data for a paper receipt (not written in XML), receipt attribute data with no print styles (not written in XML), or data written in XML, is generated as the receipt data.

The main functional components of the mobile device 2 include an application storage unit 61, a web registration unit 62, a customer ID storage unit 63, and a mobile receipt managing unit 64. The application storage unit 61 stores the electronic receipt management application 21. The web registration unit 62 handles web registration (member registration) as a function of the electronic receipt management application 21. Registration enables receiving the web receipt generating service, and receiving incentives such as coupons when a web receipt is generated according to the receipt generating service. The customer ID storage unit 63 stores the customer ID assigned by the web receipt generating server 4 during registration through the web registration unit 62.

The mobile receipt managing unit 64 is rendered by the electronic receipt management application 21, and manages web receipts. For example, when receipt data (XML) is acquired from the POS terminal 1 (printer driver 12), the mobile receipt managing unit 64 generates and stores mobile receipt data based on a previously stored mobile receipt style sheet. A mobile receipt style sheet defines the format of the mobile receipt, and is written in markup language (such as XSL (Extensible Stylesheet Language)). Based on the generated mobile receipt data, the mobile receipt managing unit 64 also displays the mobile receipt on the display (not shown in the figure) of the mobile device 2.

The printer driver 12 has a receipt data acquisition unit 71, a decision unit 72, and a receipt generation processor 73 as the main functional components. The receipt data acquisition unit 71 gets receipt data from the POS application 11 (transaction processing unit 51).

The decision unit 72 includes an installation decision unit 81 and a web registration decision unit 82. The installation decision unit 81 determines whether or not the electronic receipt management application 21 is installed on the target mobile device 2 (is stored in the application storage unit 61).

The web registration decision unit 82 determines if web registration has been processed by the electronic receipt management application 21. More specifically, if the customer ID is stored in the customer ID storage unit 63 of the mobile device 2, "web registration: yes" is determined; if the customer ID is not stored, "web registration: no" is determined. Note that determining if web registration is completed is not limited to customer ID detection, and whether web registration has been completed may be determined based on whether or not a flag or e-mail address indicating that web registration was completed is found.

The receipt generation processor 73 includes a receipt generation decision unit 83, a paper receipt generation processor 84, a mobile receipt generation processor 85, and a web receipt generation processor 86. The receipt generation decision unit 83 determines whether to produce a paper receipt and/or an electronic receipt based on the decision of the decision unit 72. More specifically, the receipt generation decision unit 83 returns "electronic receipt: yes; paper receipt: no" if the installation decision unit 81 determines that the electronic receipt management application is installed, and returns "electronic receipt: no; paper receipt: yes" if the electronic receipt management application is not installed. In addition, the receipt generation decision unit 83 returns "mobile receipt: yes; web receipt: yes" if the web registration decision unit 82 determines that web registration is completed, and returns "mobile receipt: yes; web receipt: no" if web registration is not completed The paper receipt generation processor 84 runs the paper receipt generating process. More specifically, it runs a language conversion process, paper receipt data generating process, and paper receipt data transmission process. If the receipt data acquired by the receipt data acquisition unit 71 is written in a specific language other than XML, the language conversion process converts the receipt data according to a previously stored specific conversion format from the specific language to XML (POSLog). After conversion, the receipt data is receipt attribute data with no printing style information. The paper receipt data generating process converts XML receipt data based on a previously stored paper receipt style sheet, and generates paper receipt data, which is print data for a paper receipt. The paper receipt data may be in XML (such as EXC/POS.XML), or non-XML data, depending on the specifications of the printer 3 (whether or not the printer 3 can interpret XML). The paper receipt data transmission process sends the generated paper receipt data to the printer 3. If the printer 3 specifications are unknown, receipt data is generated and sent in both XML and non-XML languages, and the printer 3 may discard the receipt data with which it is not compatible.

The mobile receipt generation processor 85 executes a mobile receipt generating process. More specifically, it sends XML receipt data to the mobile device 2. The web receipt generation processor 86 executes a web receipt generating process. More specifically, it sends XML receipt data to the web receipt generating server 4.

The main functional component of the printer 3 is a print unit 91. The print unit 91 prints the paper receipt data (in XML or non-XML language) sent from the printer driver 12 (paper receipt generation processor 84) to receipt paper.

The main functional component of the web receipt generating server 4 is a web receipt generating unit 101. The web receipt generating unit 101 is rendered by the web receipt generating program 41, and generates and publishes web receipt data based on a previously stored web receipt style sheet.

Note that the web receipt generating unit 101 may add coupon information when generating web receipt data. For example, a coupon code enabling the store to provide a discount service may be sent to customers that view a web receipt, or a coupon image that can be printed out and used as a coupon may be displayed. This configuration enables providing incentives to customers that provide customer information (customers that completed web registration).

The receipt generating process is described next with reference to the flow chart in FIG. 3. When receipt data is acquired from the POS application 11 (S01), the printer driver 12 communicates with the wireless IC tag 22 through the wireless IC reader/writer 13 (S02). If communication with the wireless IC tag 22 does not succeed (S03 returns NO, such as when the wireless IC tag 22 is not within communication range), the paper receipt generation processor 84 runs the paper receipt generating process (S04). If communication with the wireless IC tag 22 succeeds (S03 returns YES), the chip ID is acquired from the wireless IC tag 22 (S05). The chip ID is used as an ID for communication.

The printer driver 12 then communicates with the electronic receipt management application 21 (S06), and if the electronic receipt management application 21 is not installed (S07 returns NO), runs the paper receipt generating process (S04). If the electronic receipt management application 21 is installed (S07 returns YES), communication with the electronic receipt management application 21 is established (S08). The electronic receipt management application 21 also determines if web registration is completed (S09), and if web registration is not completed (S09 returns NO), the mobile receipt generation processor 85 executes the mobile receipt generating process (S10).

If the electronic receipt management application 21 determines web registration is completed (S09 returns YES), the customer ID issued during web registration is acquired from the electronic receipt management application 21 (S11). The customer ID is relationally stored to the receipt data in the POS terminal 1 or on a receipt management server not shown. The stored data is used for sales information analysis or analyzing customer purchasing behavior, for example. After acquiring the customer ID, the printer driver 12 executes the web receipt generating process (S12) by the web receipt generation processor 86, and the mobile receipt generating process (S13) by the mobile receipt generation processor 85. The order of steps S12 and S13 may be reversed.

As described above, the printer driver 12 in this first embodiment determines whether or not the electronic receipt management application 21 rendering the electronic receipt receiving function is installed on the target mobile device 2, and issues an electronic receipt if the application is installed. In other words, if the electronic receipt management application 21 is not installed on the mobile device 2, the electronic receipt generating process is not performed and unnecessary processing can be prevented. A receipt not being issued can also be prevented because a paper receipt is produced if the electronic receipt management application 21 is not installed.

Furthermore, because the receipt data is converted to XML by the printer driver 12 if the receipt data acquired from the POS application 11 is written in a specific language other than XML, compatibility with both POS applications 11 that output XML and POS applications 11 that output in a language other than XML can be maintained. In addition, because XML (markup language), which is a universal language that is independent of the OS and application environment, is used, editing with a style sheet is simple and handling receipt data is easy.

Furthermore, because the printer driver 12 handles the decision process and receipt generating process, the invention can be achieved at low cost without changing the POS application 11 by installing the printer driver 12.

When the electronic receipt management application 21 determines web registration is completed (S09 in FIG. 3 returns YES), this embodiment produces a web receipt and a mobile receipt, but generating only a web receipt is also conceivable. When the electronic receipt management application 21 is installed, a paper receipt may also be issued instead of only an electronic receipt. In other words, the paper receipt generating process may be executed before or after S10 in FIG. 9, or before or after S12 or S13.

Whether the electronic receipt management application 21 is installed is determined in this embodiment, but the presence of an application other than the electronic receipt management application 21 may be detected instead. For example, if a specific application is installed for environmental protection (reducing paper waste), deciding to produce an electronic receipt and not produce a paper receipt is also conceivable. Conversely, if a specific application for converting a paper receipt to an electronic receipt is installed, deciding to issue a paper receipt and not issue an electronic receipt is also conceivable.

A mobile receipt is sent to the mobile device 2 in the foregoing embodiment, but could be provided to a terminal other than the mobile device 2 (such as a home computer) or to an IC card. However, if the customer wants a mobile receipt sent to a device other than a mobile terminal or IC card, such as a home PC, the destination of the mobile receipt (such as an e-mail address) is preferably stored in the electronic receipt management application 21 (mobile receipt managing unit 64), and provided to the printer driver 12 in the receipt generating process.

The mobile receipt managing unit 64 in this embodiment acquires XML receipt data from the POS terminal 1 (printer driver 12) and generates mobile receipt data based on a previously stored mobile receipt style sheet, but may acquire and store mobile receipt data directly from the POS terminal 1. In this configuration the mobile receipt style sheet is stored in the printer driver 12, and the mobile receipt data is generated and provided by the printer driver 12 (mobile receipt generation processor 85).

The receipt generation processor 73 in this embodiment generates XML receipt data, but conversion to XML is not always necessary. For example, if the electronic receipt management application 21 or web receipt generating server 4 can interpret a specific language other than XML, receipt data in that specific language (such as the receipt data acquired from the transaction processing unit 51) may be sent.

Embodiment 2

A second embodiment of the invention is described next with reference to FIG. 4 to FIG. 6. An electronic receipt is produced unconditionally in the first embodiment when the electronic receipt management application 21 is installed on the mobile device 2, but this embodiment produces a paper receipt and/or electronic receipt according to receipt generating conditions set by the user. Only the differences between this and the first embodiment are described below. Note that like parts in this and the first embodiment are identified by like reference numerals, and further description thereof is omitted. Variations that are applicable to the same parts in the first embodiment are also applicable to this embodiment.

Figure 4:
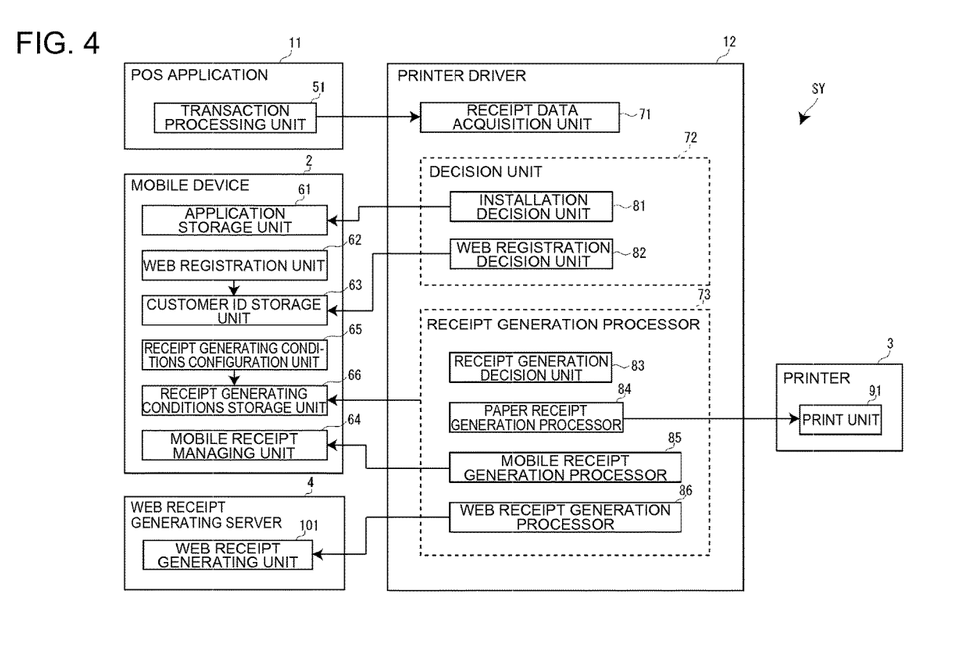
FIG. 4 is a function block diagram of a receipt generating system according to a second embodiment of the invention.

FIG. 4 is a function block diagram of a receipt generating system SY according to the second embodiment of the invention. Compared with the first embodiment (see FIG. 2), the receipt generating system SY according to this embodiment also has a receipt generating conditions configuration unit 65 and a receipt generating conditions storage unit 66 in the mobile device 2.

The receipt generating conditions configuration unit 65 sets whether or not to produce paper receipts and electronic receipts, and the method of generating an electronic receipt (a first generating method that publishes an electronic receipt by the web receipt generating server 4, and a second generating method that sends an electronic receipt to the mobile device 2) as the receipt generating conditions. When the first generating method is selected, the receipt generation processor 73 runs the web receipt generating process, and runs the mobile receipt generating process when the second generating method is selected.

Figure 5:
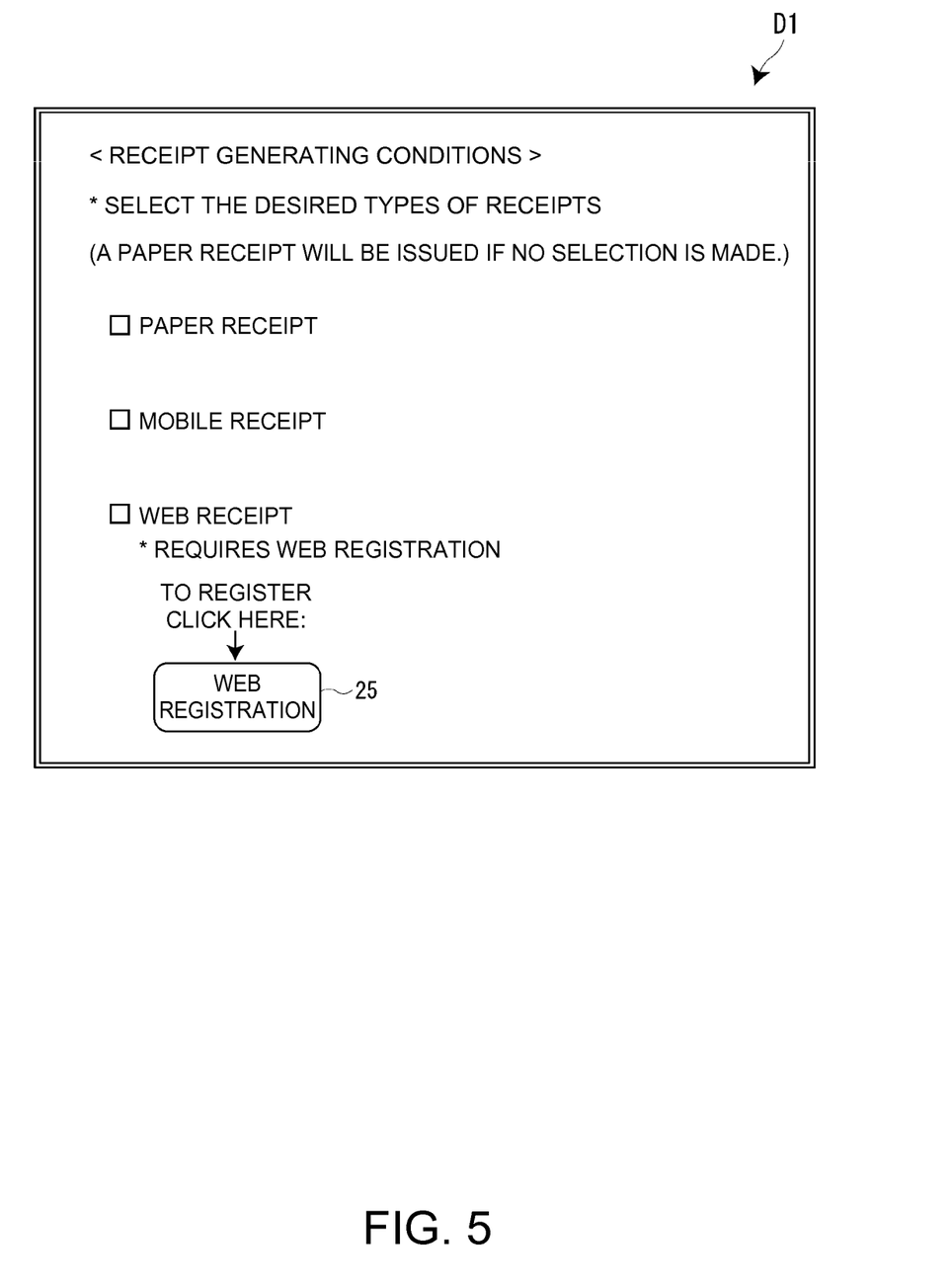
FIG. 5 shows an example of a receipt generating conditions configuration screen.

FIG. 5 shows an example of a receipt generating conditions configuration screen D1 for setting the receipt generating conditions. The receipt generating conditions configuration screen D1 is a window that is displayed on the display (not shown in the figure) of the mobile device 2 as a function of the electronic receipt management application 21. As shown in the figure, the receipt generating conditions configuration screen D1 enables setting whether or not to produce an electronic receipt, a mobile receipt, and a web receipt, respectively. The web registration URL of the web receipt generating server 4 can also be accessed by clicking on the web registration button 25. In addition, only a paper receipt is generated if a selection is not made in the receipt generating conditions configuration screen D1 (when a paper receipt, mobile receipt, and web receipt is not selected).

The receipt generating conditions storage unit 66 stores the setting from the receipt generating conditions configuration unit 65. As a result, when the installation decision unit 81 determines that the electronic receipt management application is installed, the receipt generation decision unit 83 decides to generate an electronic receipt according to the receipt generating conditions and whether or not web registration is completed. The receipt generation decision unit 83 returns "electronic receipt: no; paper receipt: yes" if the electronic receipt management application is not installed. The paper receipt generation processor 84, mobile receipt generation processor 85, and web receipt generation processor 86 also execute the respective receipt generating processes according to the decision of the receipt generation decision unit 83.

Figure 6:
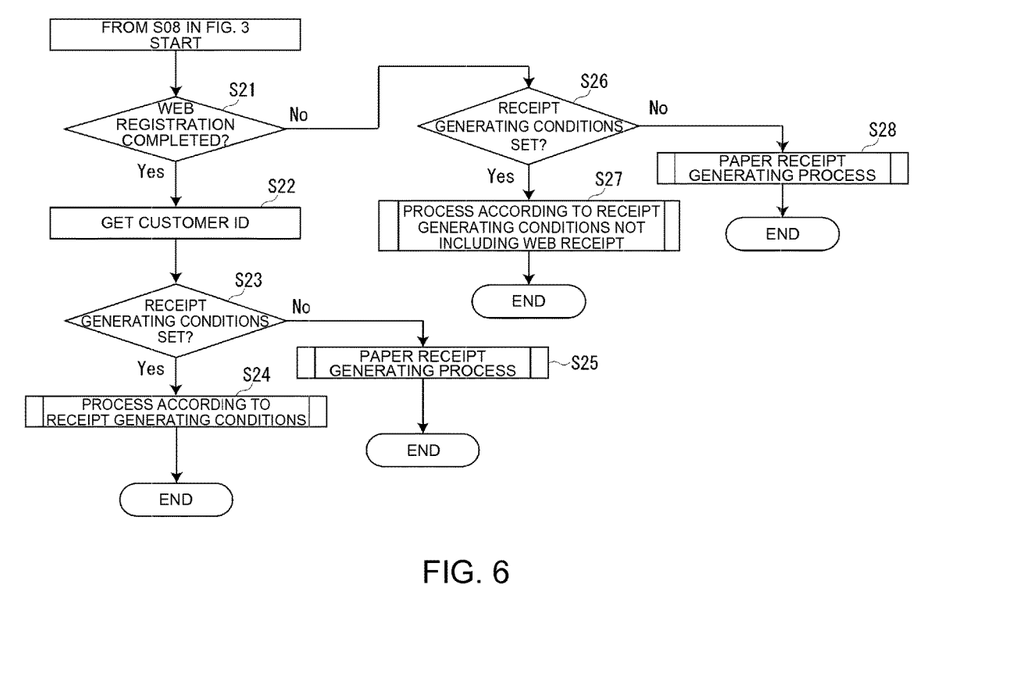
FIG. 6 is a flow chart showing the receipt generating process according to the second embodiment of the invention.

FIG. 6 is a flow chart of the receipt generating process according to the second embodiment of the invention. Note that because steps S01 to S08 in the first embodiment in FIG. 3 are the same in this embodiment, this flow chart starts after step S08. After communication with the electronic receipt management application 21 is established (S08 in FIG. 3), the printer driver 12 determines if web registration by the electronic receipt management application 21 is completed (S21). If web registration is completed (S21 returns YES), the printer driver 12 gets the customer ID from the electronic receipt management application 21 (S22), and determines if the receipt generating conditions are set (if receipt generating conditions are stored in the receipt generating conditions storage unit 66) (S23). If receipt generating conditions are set (S23 returns YES), the printer driver 12 executes the processes according to the receipt generating conditions (S24). If receipt generating conditions are not set (S23 returns NO), the paper receipt generation processor 84 runs the paper receipt generating process (S25).

If web registration by the electronic receipt management application 21 is not completed (S21 returns NO), the printer driver 12 determines if the receipt generating conditions are set (S26), and if the receipt generating conditions are set (S26 returns YES), executes a process according to the receipt generating conditions for a receipt other than a web receipt (S27). In other words, if a web receipt is selected, the selection is ignored and a receipt generating process is executed according to the paper receipt and mobile receipt settings. However, if only a web receipt is selected, the paper receipt generating process is executed. Note that in this event, the paper receipt generation processor 84 preferably embeds message information so that a message indicating that web registration is not completed and why (such as "A web receipt is not issued because web registration is not completed. Please register on the web.") is printed somewhere on the paper receipt. However, if receipt generating conditions are set (S26 returns NO), the paper receipt generation processor 84 executes the paper receipt generating process (S28).

In addition to the effect of the first embodiment, the second embodiment can thus provide a service for producing the receipts desired by the user (one or more of a paper receipt, mobile receipt, and web receipt) as a result of the user setting the receipt generating conditions.

One or more receipt is selected from paper receipts, mobile receipts, and web receipts as the receipt generating condition in this embodiment, but either a paper receipt or an electronic receipt could be selected. In this configuration, a mobile receipt and a web receipt are issued by selecting an electronic receipt. Further alternatively, selecting only a paper receipt, or selecting only a electronic receipt, could be selected as the receipt generating condition.

Embodiment 3

A third embodiment of the invention is described next with reference to FIG. 7. In the first and second embodiments the printer driver 12 runs the decision process and receipt generating process, but these are run by the printer 3 in this embodiment. More specifically, this embodiment applies the receipt generating device of the invention to the printer 3. The differences between this and the first embodiment are described below. Note that like parts in this and the first embodiment are identified by like reference numerals, and further description thereof is omitted.

Figure 7:
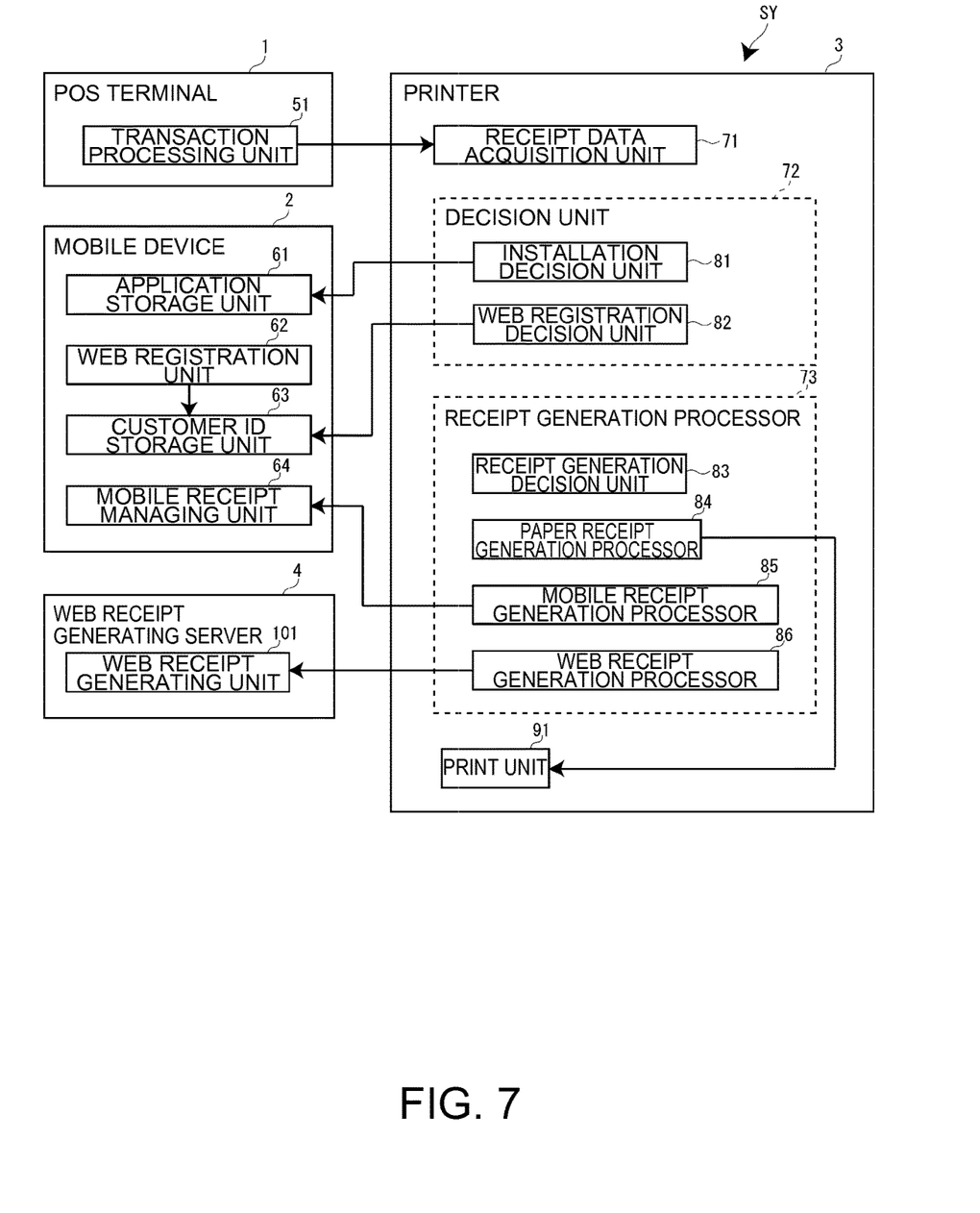
FIG. 7 is a function block diagram of a receipt generating system according to a third embodiment of the invention.

FIG. 7 is a function block diagram of a receipt generating system SY according to the third embodiment of the invention. As shown in the figure, units 71 to 86 in the printer driver 12 of the first embodiment (see FIG. 2) are disposed in the printer 3 in this embodiment. The print unit 91 of this embodiment also prints based on the paper receipt data generated by the paper receipt generation processor 84.

While the system configuration of this embodiment is not specifically shown in the figure, this system differs from the configuration of the first system shown in FIG. 1 in that the printer 3 and the web receipt generating server 4 are connected through a computer network. Another difference is that the wireless IC reader/writer 13 is in the printer 3 and communicates with the mobile device 2 (wireless IC tag 22).

This third embodiment thus enables achieving the invention at low cost without changing the POS terminal 1 (POS application 11 and printer driver 12) by introducing the printer 3.

Three embodiments of the invention are described above, but elements of the receipt generating systems SY described in these embodiments can also be embodied as a program. The program can also be provided stored on various types of recording media (including CD-ROM and flash memory media). More specifically, a program causing a computer to function as the elements of the receipt generating system SY, and a recording medium storing the program, are also included in the scope of the present invention.

The receipt generating device of the invention is applied to the printer driver 12 in the first and second embodiments, and to the printer 3 in the third embodiment, but could also be a dedicated device. In this case, the system may be configured to enable the receipt generating device to communicate with the POS terminal 1 and printer 3. Other variations are also possible without departing from the scope of the accompanying claims.

As described above, the present invention is useful in a receipt generating device and a control method for a receipt generating device that runs a receipt generating process for producing a paper receipt and/or electronic receipt, and is particularly suited to a configuration that runs a receipt generating process based on whether or not a particular application is installed on a mobile communication terminal.

REFERENCE SIGNS LIST

1 POS terminal
2 mobile device
3 printer
4 web receipt generating server
11 POS application
12 printer driver
13 wireless IC reader/writer
21 electronic receipt management application
22 wireless IC tag
25 web registration
31 firmware
32 print mechanism
D1 receipt generating conditions configuration screen
SY receipt generating system

TEXT IN THE FIGURES

Figure 2:
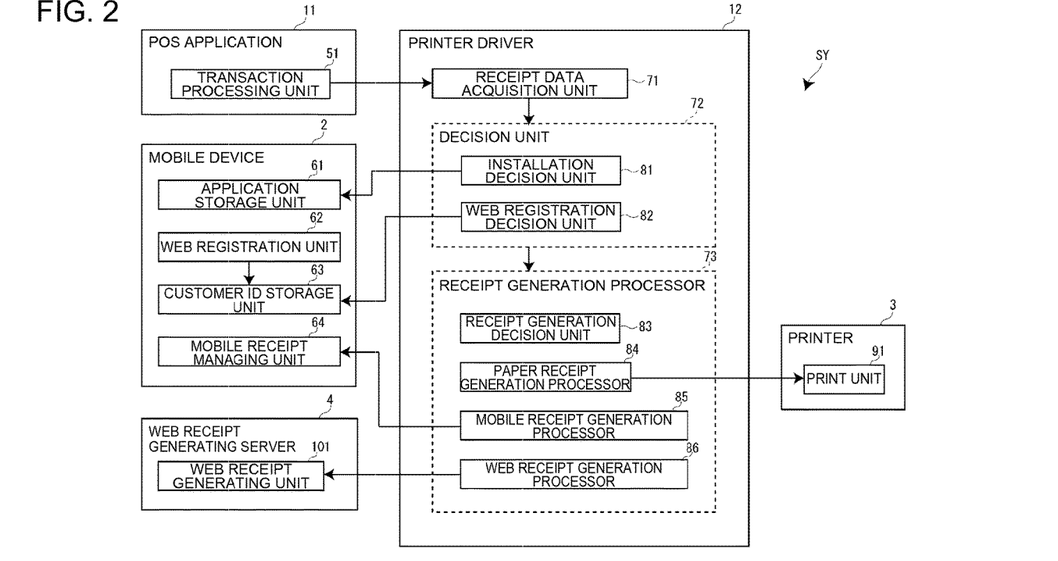
FIG. 2 is a function block diagram of a receipt generating system according to a first embodiment of the invention.
Figure 3:
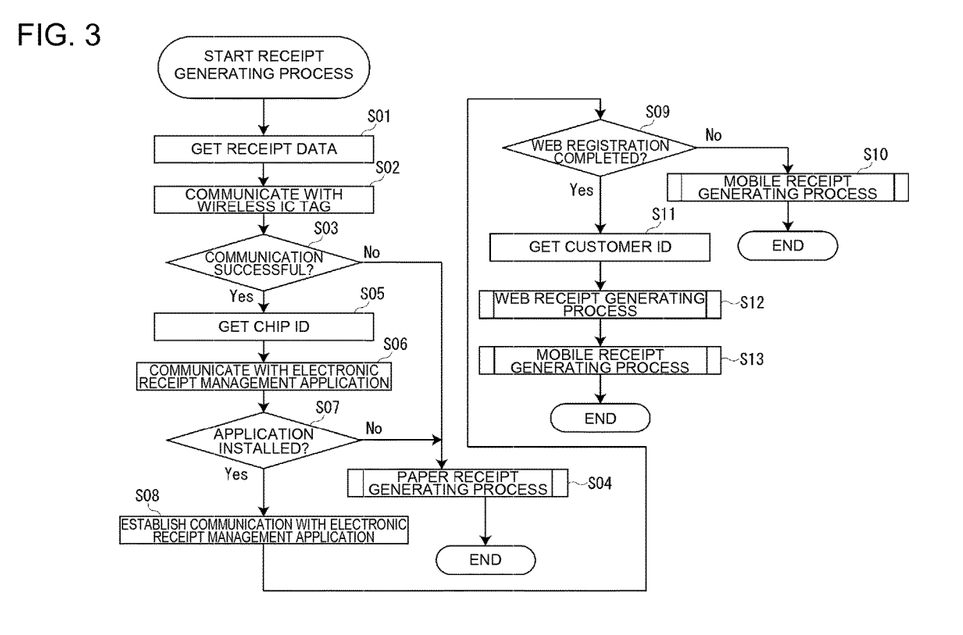
FIG. 3 is a flow chart showing the receipt generating process according to the first embodiment of the invention.

FIG. 1
POS TERMINAL 1
POS APPLICATION 11
PRINTER DRIVER 12
WIRELESS IC READER/WRITER 13
MOBILE DEVICE 2
ELECTRONIC RECEIPT MANAGEMENT APPLICATION 21
WIRELESS IC TAG 22
WEB RECEIPT GENERATING SERVER 4
WEB RECEIPT GENERATING PROGRAM 41
PRINTER 3
FIRMWARE 31
PRINT MECHANISM 32
FIG. 2
POS APPLICATION 11
TRANSACTION PROCESSING UNIT 51
MOBILE DEVICE 2
APPLICATION STORAGE UNIT 61
WEB REGISTRATION UNIT 62
CUSTOMER ID STORAGE UNIT 63
MOBILE RECEIPT MANAGING UNIT 64
WEB RECEIPT GENERATING SERVER 4
WEB RECEIPT GENERATING UNIT 101
PRINTER DRIVER 12
RECEIPT DATA ACQUISITION UNIT 71
DECISION UNIT 72
INSTALLATION DECISION UNIT 81
WEB REGISTRATION DECISION UNIT 82
RECEIPT GENERATION PROCESSOR 73
RECEIPT GENERATION DECISION UNIT 83
PAPER RECEIPT GENERATION PROCESSOR 84
MOBILE RECEIPT GENERATION PROCESSOR 85
WEB RECEIPT GENERATION PROCESSOR 86
PRINTER 3
PRINT UNIT 91
FIG. 3
START RECEIPT GENERATING PROCESS
S01 GET RECEIPT DATA
S02 COMMUNICATE WITH WIRELESS IC TAG
S03 COMMUNICATION SUCCESSFUL?
S04 PAPER RECEIPT GENERATING PROCESS
S05 GET CHIP ID
S06 COMMUNICATE WITH ELECTRONIC RECEIPT MANAGEMENT APPLICATION
S07 APPLICATION INSTALLED?
S08 ESTABLISH COMMUNICATION WITH ELECTRONIC RECEIPT MANAGEMENT APPLICATION
S09 WEB REGISTRATION COMPLETED?
S10 MOBILE RECEIPT GENERATING PROCESS
S11 GET CUSTOMER ID
S12 WEB RECEIPT GENERATING PROCESS
S13 MOBILE RECEIPT GENERATING PROCESS
END
FIG. 4
POS APPLICATION 11
TRANSACTION PROCESSING UNIT 51
MOBILE DEVICE 2
APPLICATION STORAGE UNIT 61
WEB REGISTRATION UNIT 62
CUSTOMER ID STORAGE UNIT 63
MOBILE RECEIPT MANAGING UNIT 64
RECEIPT GENERATING CONDITIONS CONFIGURATION UNIT 65
RECEIPT GENERATING CONDITIONS STORAGE UNIT 66
WEB RECEIPT GENERATING SERVER 4
WEB RECEIPT GENERATING UNIT 101
PRINTER DRIVER 12
RECEIPT DATA ACQUISITION UNIT 71
DECISION UNIT 72
INSTALLATION DECISION UNIT 81
WEB REGISTRATION DECISION UNIT 82
RECEIPT GENERATION PROCESSOR 73
RECEIPT GENERATION DECISION UNIT 83
PAPER RECEIPT GENERATION PROCESSOR 84
MOBILE RECEIPT GENERATION PROCESSOR 85
WEB RECEIPT GENERATION PROCESSOR 86
PRINTER 3
PRINT UNIT 91
FIG. 5
RECEIPT GENERATING CONDITIONS
SELECT THE DESIRED TYPES OF RECEIPTS
(A PAPER RECEIPT WILL BE ISSUED IF NO SELECTION IS MADE.)
PAPER RECEIPT
MOBILE RECEIPT
WEB RECEIPT
REQUIRES WEB REGISTRATION
TO REGISTER CLICK HERE:
WEB REGISTRATION 25
FIG. 6
FROM S08 IN FIG. 3
START
S21 WEB REGISTRATION COMPLETED?

S22 GET CUSTOMER ID
S23 RECEIPT GENERATING CONDITIONS SET?
S24 PROCESS ACCORDING TO RECEIPT GENERATING CONDITIONS
S25 PAPER RECEIPT GENERATING PROCESS
S26 RECEIPT GENERATING CONDITIONS SET?
S27 PROCESS ACCORDING TO RECEIPT GENERATING CONDITIONS NOT INCLUDING WEB RECEIPT
S28 PAPER RECEIPT GENERATING PROCESS
END
FIG. 7
POS TERMINAL 1
TRANSACTION PROCESSING UNIT 51
MOBILE DEVICE 2
APPLICATION STORAGE UNIT 61
WEB REGISTRATION UNIT 62
CUSTOMER ID STORAGE UNIT 63
MOBILE RECEIPT MANAGING UNIT 64
WEB RECEIPT GENERATING SERVER 4
WEB RECEIPT GENERATING UNIT 101
PRINTER 3
RECEIPT DATA ACQUISITION UNIT 71
DECISION UNIT 72
INSTALLATION DECISION UNIT 81
WEB REGISTRATION DECISION UNIT 82
RECEIPT GENERATION PROCESSOR 73
RECEIPT GENERATION DECISION UNIT 83
PAPER RECEIPT GENERATION PROCESSOR 84
MOBILE RECEIPT GENERATION PROCESSOR 85
WEB RECEIPT GENERATION PROCESSOR 86
PRINT UNIT 91

The invention claimed is:

1. A receipt generating device comprising:
a decision unit that determines if an application that processes electronic receipts is installed on a mobile device; and
a receipt generation processor including a paper receipt generation processor in communication with a printer, a web receipt generation processor, a mobile receipt generation processor, and a receipt generating process unit, wherein the receipt generating process unit determines whether or not to generate an electronic receipt according to a decision of the decision unit, and wherein one of the web receipt generation processor and the mobile receipt generation processor executes an electronic receipt generating process according to the decision.

2. The receipt generating device described in claim 1, wherein:
the receipt generation processor executes the electronic receipt generating process by the mobile receipt generation processor if the decision unit determines the application is installed on the mobile device; and
the receipt generation processor does not execute the electronic receipt generating process if the decision unit determines the application is not installed on the mobile device.

3. The receipt generating device described in claim 2, wherein:
the decision unit determines if web registration processed by the application has been completed;
the receipt generation processor executes via the web receipt generation processor the electronic receipt generating process to send the electronic receipt to a server connected to a network if the decision unit determines web registration has been completed; and the receipt generation processor executes via the mobile receipt generation processor the electronic receipt generating process to send the electronic receipt to the mobile device if the decision unit determines web registration has not been completed.

4. The receipt generating device described in claim 3, wherein:
the receipt generation processor executes via the mobile receipt generation processor the electronic receipt generating process to send the electronic receipt to the mobile device if the decision unit determines web registration has been completed.

5. The receipt generating device described in claim 1, wherein:
the receipt generation processor executes via the paper receipt generation processor a paper receipt generating process to produce a paper with the printer receipt if the decision unit determines the application is not installed on the mobile device.

6. The receipt generating device described in claim 5, wherein:
the application can set a receipt generating condition including whether or not to generate the paper receipt and/or the electronic receipt; and
the receipt generation processor executes the paper receipt generating process and/or the electronic receipt generating process according to the receipt generating conditions if the decision unit determines the application is installed on the mobile device.

7. A control method of a receipt generating device, comprising:
communicating with a mobile device;
determining, with a decision unit, whether an application that processes electronic receipts is installed on the mobile device;
determining, with a receipt generating process unit, whether or not to generate an electronic receipt according to the determining step of the decision unit; and
executing an electronic receipt generating process, with a mobile receipt generation processor, that produces the electronic receipt if the application that processes electronic receipts is installed,
wherein a receipt generation processor includes a paper receipt generation processor in communication with a printer, a web receipt generation processor, the mobile receipt generation processor, and the receipt generating process unit.

8. The control method of a receipt generating device described in claim 7, further comprising:
executing the electronic receipt generating process if the application is installed on the mobile device; and
not executing the electronic receipt generating process, and executing, with the paper receipt generation processor, a paper receipt generating process that produces a paper receipt, if the application is not installed on the mobile device.

9. The control method of a receipt generating device described in claim 8, further comprising:
determining if web registration processed by the application has been completed;
executing, on the web receipt generation processor, the electronic receipt generating process to send the electronic receipt to a server connected to a network if web registration has been completed; and executing, on the mobile receipt generation processor, the electronic receipt generating process to send the electronic receipt to the mobile device if web registration has not been completed.

10. The control method of a receipt generating device described in claim 9, further comprising:
executing the electronic receipt generating process to send the electronic receipt to the mobile terminal if web registration has been completed.

11. The control method of a receipt generating device described in claim 8, wherein:
the application can set a receipt generating condition including whether or not to generate the paper receipt and/or the electronic receipt; and
the paper receipt generating process and/or the electronic receipt generating process is executed according to the receipt generating conditions if the application is installed on the mobile device.

* * * * *